United States Patent
Hosoya et al.

[11] Patent Number: 5,873,786
[45] Date of Patent: Feb. 23, 1999

[54] SPEED REDUCER WITH SHOCK ABSORBING MECHANISM

[75] Inventors: Osamu Hosoya, Kiryu; Masaki Mita, Ashikaga, both of Japan

[73] Assignee: Mitsuba Corporation, Kiryu, Japan

[21] Appl. No.: 856,993

[22] Filed: May 15, 1997

[30] Foreign Application Priority Data

May 17, 1996 [JP] Japan ................................. 8-148167
May 17, 1996 [JP] Japan ................................. 8-148168

[51] Int. Cl.$^6$ ........................................ F16D 3/50
[52] U.S. Cl. .............................. 464/73; 464/92; 464/76
[58] Field of Search ........................... 464/76, 81, 87, 464/92, 93, 100, 73

[56] References Cited

U.S. PATENT DOCUMENTS

| | | | |
|---|---|---|---|
| 3,475,923 | 11/1969 | Spence | 464/76 |
| 3,662,568 | 5/1972 | Kashima et al. | 464/93 |
| 3,724,239 | 4/1973 | Calistrat | 464/92 |
| 4,228,664 | 10/1980 | McCoy | 464/92 |
| 4,748,865 | 6/1988 | Umezawa et al. | 464/92 |
| 5,545,089 | 8/1996 | Kirschey | 464/160 |
| 5,564,981 | 10/1996 | Iwabuchi et al. | 464/92 |

FOREIGN PATENT DOCUMENTS

| | | |
|---|---|---|
| 60-73982 | 4/1985 | Japan . |
| 62-82457 | 5/1987 | Japan . |
| 5-1054 | 1/1993 | Japan . |
| 6-341493 | 12/1994 | Japan . |

*Primary Examiner*—Eileen Dunn Lillis
*Attorney, Agent, or Firm*—Oliff & Berridge, PLC

[57] ABSTRACT

A speed reducer is provided with a shock absorbing rubber damper disposed in a power transmission path from a first wheel to which a driving force of a motor is input to a second wheel from which the power is output. First projecting portions 3e and auxiliary projecting portions 3f are provided on a first wheel. Second projecting portions 5b are provided on a second wheel 5. The projecting portions are disposed together in intervals T defined between segmented rubber dampers 6. Receiver plates 7, 8 are attached to the end surfaces 6a, 6b of the rubber dampers 6 and serve as load bearing surfaces confronting the projections 3e, 3f and 5b so as to approximately distribute the loads over the entire end surfaces. Two receiver plates 7, 8 disposed across the end surfaces 6a, 6b can be arranged as an integral receiver plate unit U. With this arrangement, a shock absorbing capability is enhanced as well as the number of parts can be reduced.

15 Claims, 7 Drawing Sheets

SPEED REDUCER WITH SHOCK ABSORBING MECHANISM

BACKGROUND OF THE INVENTION

1. Field of Invention

The present invention relates to a speed reducer with a shock absorber which can be used with electrical equipment mounted on automobiles and the like.

2. Description of Related Art

In general, some related speed reducers are provided with a rubber damper disposed in a power transmission path from a worm wheel meshed with a worm gear to which a driving force of a motor is transmitted, to a power output shaft as known from Japanese Unexamined Patent Publication No. 60-73982 and Japanese Unexamined Utility Model Publication No. 62-82457. These speed reducers are arranged such that a rubber damper is interposed between a pair of wheels which confront each other with an interval defined therebetween and the confronting surfaces of the rubber damper and the wheels are integrally bonded. In these speed reducers, however, since the rubber damper is twisted at both the ends thereof in an axial direction, if both the plates are insufficiently bonded to the rubber damper, not only is there a possibility that the rubber damper is stripped from the wheels, but also there is a factor for making it difficult to reduce the weight of the speed reducers because a strong metal sheet must be employed as the wheels and the power output shaft must be journaled by a casing through a dedicated bearing.

The inventors of the present invention previously proposed a speed reducer in Japanese Utility Model Application No. 3-55728 (Japanese Unexamined Utility Model Publication No. 5-1054) to solve the defect of the above prior art. The speed reducer is arranged such that a pair of wheels confronting each other in an axial direction have sides which project therefrom in a confronting direction. The projecting sides are spaced from each other with an interval defined between them in an axis-rotational direction to permit rubber dampers to be disposed in the interval. With this arrangement, the rubber dampers are pressed in the axis-rotational direction by the projecting sides to absorb shock. In this case, when the side projecting from one of the wheels acts as a presser for pressing the dampers, the side projecting from the other of the wheels acts as a pressure receiver for receiving the dampers. However, the speed reducer has a drawback that since the rubber dampers which perform a shock absorbing action are essentially only being used to half of their capabilities, a shock absorbing effect is low and there is a waste of shock absorbing ability. This is because the shock absorbing action achieved by the speed reducer is such that when it is assumed that a load from one of the projecting sides acts on the other projecting side as with a clockwise load, no load acts on the rubber damper on the counterclockwise side of the one of the projecting sides and only the rubber damper on the clockwise side thereof is pressed.

To overcome this drawback, the inventors of the present invention proposed a speed reducer in Japanese Patent Application No. 5-156221 (Japanese Unexamined Patent Publication No. 6-341493) which is arranged such that first and second projections projecting from first and second wheels, respectively, are disposed together in the respective intervals of a plurality of shock absorbing rubber dampers so that all the rubber dampers perform a shock absorbing action.

In the speed reducer arranged as described above, however, the first and second projections located together in an arbitrary interval must be disposed in parallel with each other in a diametrical direction so that any of them can directly compress the rubber dampers (compression is securely executed by any one of them). Thus, the surfaces of the rubber dampers are partially compressed by the respective projections and the compressed surfaces are unevenly distributed in the diametrical direction and as a result the respective rubber dampers are deformed in a strained state without being evenly compressed and deformed, which is a problem to be solved by the present invention.

Further, it is also a problem to be solved by the present invention to reduce the number of parts as much as possible in the solution of the above problems.

SUMMARY OF THE INVENTION

According to the present invention made to solve the above problems in consideration of the above circumstances, there is provided a speed reducer with a shock absorbing mechanism including a first wheel to which a forward and backward driving force of a motor is input after the speed thereof is reduced, a second wheel on a power output side and shock absorbing rubber dampers disposed to define intervals in an axis-rotational direction. The speed reducer with the shock absorbing mechanism is arranged such that first and second projections projecting from the first and second wheels, respectively are disposed together in the intervals of the rubber dampers so that the power is transmitted from the first wheel to the second wheel in a shock interfered state by compressing the rubber dampers in such a manner that the rubber dampers pressed by the first projections are received by the second projections, wherein receiver plates are attached to the respective end surfaces of the rubber dampers which confront the respective projections for transmitting the compressing force from the respective confronting projections to the rubber dampers.

With this arrangement, even if the projections are smaller than the confronting surfaces of the rubber dampers, the rubber dampers can be uniformly pressed to thereby enhance an effective damping capability.

According to the present invention arranged as described above, there can be formed a plurality of the intervals in which the first and second projections are disposed together in the axis-rotational direction and the receiver plates on one side of the rubber dampers as viewed in a first arbitrary axis-rotational direction are formed integrally, while the receiver plates on the other side of the rubber dampers as viewed in a second arbitrary axis-rotational direction opposite to the first arbitrary axis-rotational direction are also formed integrally. The receiver plates are disposed on the respective end surfaces of the rubber dampers so as to confront the respective projections of the first and second wheels.

With this arrangement, the effective damping capability can be enhanced as well as the number of parts can be reduced.

According to the present invention arranged as described above, it is possible that the first wheel has a wheel boss portion and a wheel outer peripheral portion, the first projections project from the wheel outer peripheral portion in a radially inward direction toward the central axis of the wheel and extending in an axial direction. Intervals are formed between the first projections and the wheel boss portion. The second wheel has a central wheel disc portion, and the second projections project from the wheel disc portion in an axial direction so as to pass through the intervals between the first projections and the wheel boss portion of the first wheel in the axis-rotational direction.

According to the present invention arranged as described above, it is possible that the second projections are formed by bending cut portions from the wheel disc portion of the second wheel in the axial direction.

According to the present invention arranged as described above, it is possible that auxiliary projections are formed to the wheel boss portion of the first wheel in confrontation with the first projections with intervals formed therebetween in a diametrical direction so as to permit the second projections of the second wheel to pass therethrough in the axis-rotational direction.

According to the present invention arranged as described above, it is possible that the first wheel has the boss portion and the wheel outer peripheral portion, with the first projections being arranged as a pair of projections projecting from the wheel outer peripheral portion in a radially inward direction toward the axial center and with intervals defined between them and the first wheel boss portion as well as intervals defined between the first projections in the axial direction. The second wheel has a second wheel boss portion which is loosely engaged in the intervals between the extreme ends of the first projections and the outer peripheral surface of the first w heel boss portion so as to be rotatable in the intervals. The second projections project from the outer periphery of the second wheel boss portion in a radially outward direction so as to pass through the intervals in the axial direction between the first projections in the axis-rotational direction.

According to the present invention arranged as described above, it is possible that the integrally formed receiver plates are composed of boss portions, support plate portions projecting from the boss portions in a radially outward direction and receiver plate portions being bent from the support plate portions in the axial direction.

According to the present invention arranged as described above, it is possible that the respective support plate portions overlap the one end surfaces of the corresponding rubber dampers in the axial direction and the support plates which are adjacent to each other through the rubber dampers are abutted against each other when the rubber dampers are contracted by a load applied thereto to thereby regulate the further contraction of the rubber dampers to prevent an overload.

Further, according to the present invention arranged as described above, it is possible that with the adjacent support plate portions, the end edges of the adjacent support plate portions on the abutting side thereof which are abutted to each other by a load applied thereto are formed along one axial end face of the second wheel.

DETAILED DESCRIPTION OF PREFERRED EMBODIMENTS

A first embodiment of the present invention will be described based on FIG. 1 to FIG. 4. In the drawings, numeral 1 denotes a casing including a speed reducer for reducing the speed of power from an electric motor 2 which is driven forward and backward. A boss portion 3a of a first wheel 3 is journaled by the casing 1 and an outer cylindrical portion (or outer peripheral portion) 3b formed as part of the first wheel 3 includes an outer peripheral surface having a wheel gear 3c formed thereto which is meshed with a worm gear 2b integrally formed to an output shaft 2a of the electric motor 2. Numeral 4 denotes a power output shaft journaled by the casing 1. The power output shaft 4 has an output gear (not shown) formed at the extreme end thereof which is associated and coupled with an acting unit. Numeral 5 denotes a second wheel assembled to the power output shaft 4 integrally therewith. The second wheel 5 has a disc-shaped second wheel disc portion 5a which confronts a wheel disc portion 3d making up the cylindrical bottom portion of the first wheel 3 through a predetermined interval in an axial direction.

Figure 1:
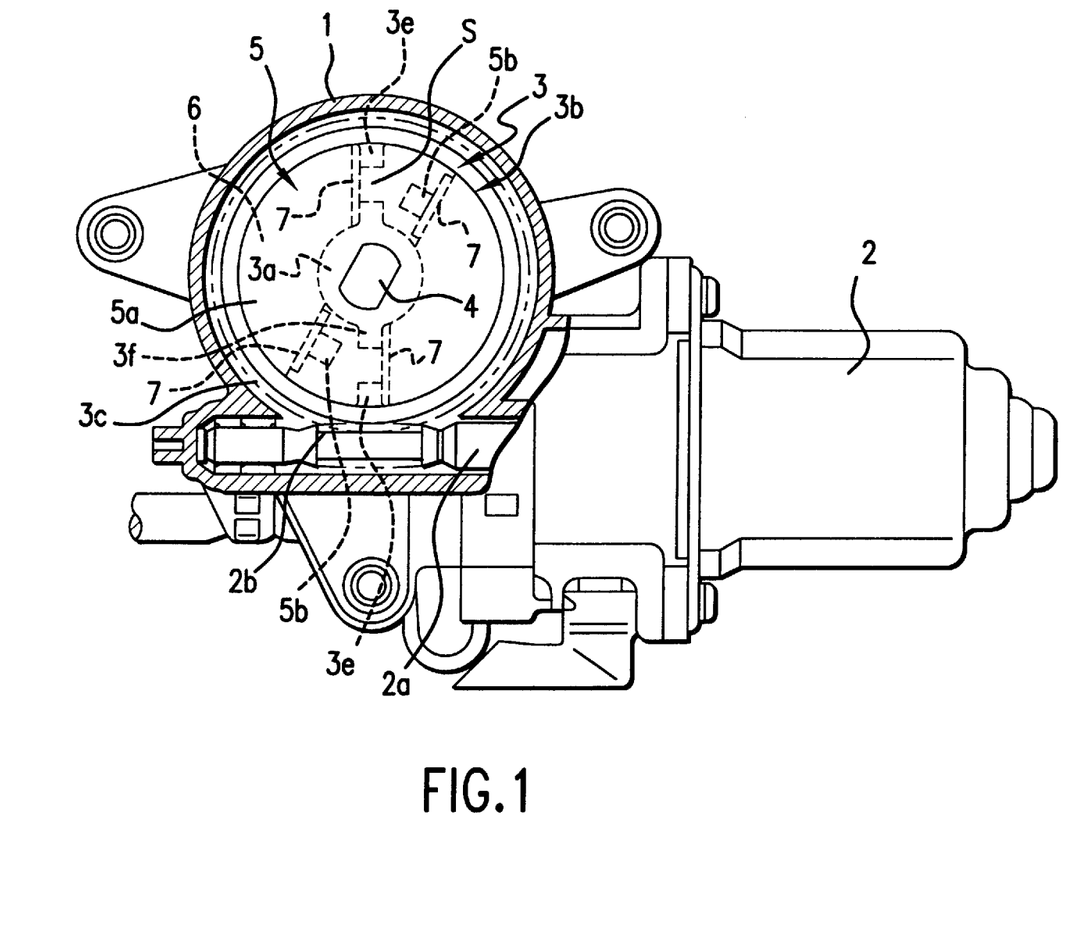
FIG. 1 is a plan view, in partial cross section, of a speed reducer.
Figure 2:
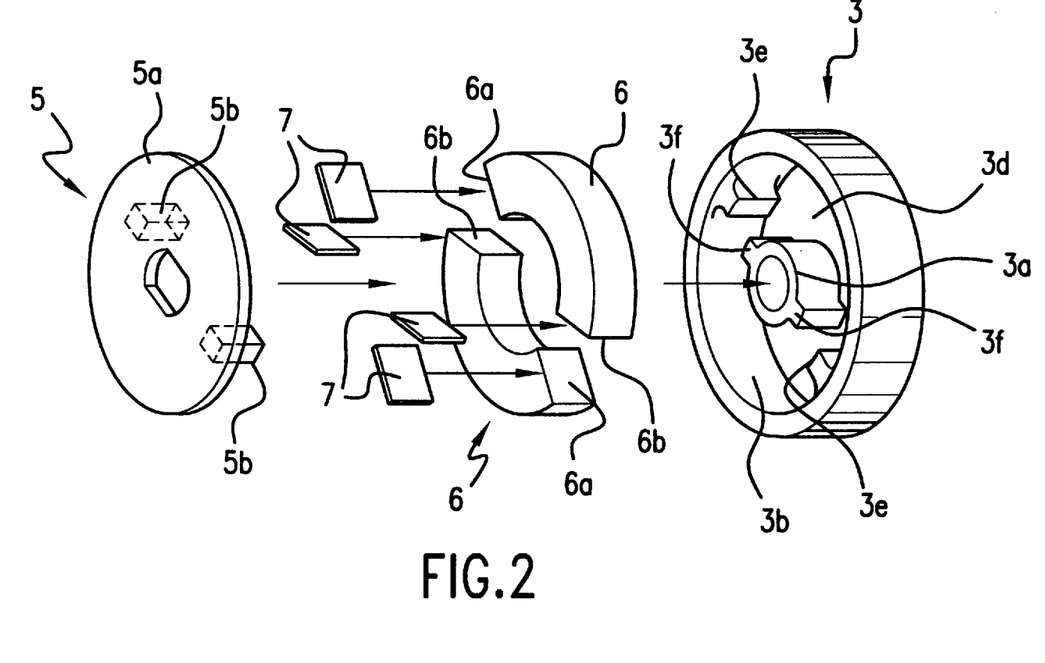
FIG. 2 is an exploded perspective view of the main portion of the speed reducer.

Further, a pair of first projections 3e project from the inner peripheral surface of the outer cylindrical portion 3b of the first wheel in a radially inward and axially extending direction. In addition, a pair of auxiliary projections 3f project from the outer peripheral surface of the first wheel boss portion 3a in a radially outward direction such that they confront the first projections 3e from the inside thereof and intervals S are formed between the extreme ends of the first projections 3e and the extreme ends of the auxiliary projections 3f. A pair of second projections 5b extend from the second wheel disc portion 5a in the axial direction (on the side of the first wheel disc portion 3d). The second projections 5b are located on an arbitrary diameter and confronting the above intervals S. The first and second wheels 3 and 5 are relatively rotatably disposed such that the second projections 5b pass through the intervals S on the first wheel 3 in an axially extending and rotational direction (or axis-rotational direction).

Numeral 6 denotes a rubber damper having a segmented ring shape and being interposed between the first wheel disc portion 3d and the second wheel disc portion 5a. The rubber damper 6 is divided into two portions in the axis-rotational direction with intervals T defined therebetween and each of the first projections 3e, the auxiliary projections 3f and the second projections 5b is disposed within the intervals T. Receiver plates 7 are each composed of a thin steel sheet and are attached to the respective end surfaces 6a and 6b of the segments of damper 6 in the axis-rotational direction. Receiver plates 7 serve as load bearing surfaces confronting the projections 3e, 3f, and 5b. The plates 7 substantially cover the entire end surfaces 6a and 6b of the segments of damper 6. Receiver plates 7 may be fixedly secured to the end surfaces 6a, 6b integrally therewith by means such as bonding or the like.

Figure 3A:
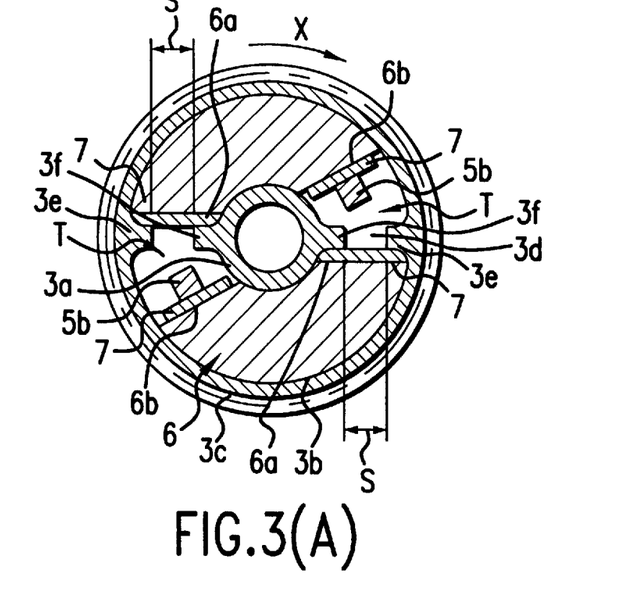
FIG. 3(A) and FIG. 3(B) are cross sectional plan views of the main portion of the speed reducer explaining the acting states thereof, respectively.

When a rotational load acts on the first wheel 3 in the direction of an arrow X in FIG. 3(A) to transmit a driving force from first wheel 3 to second wheel 5, the first projections 3e and the auxiliary projections 3f press (compress) the one end surfaces 6a of the rubber dampers as the first wheel 3 rotates to thereby permit the other end surfaces 6b of the rubber dampers to be pressed by the second projections 5b, so that the driving force of the first wheel 3 is transmitted to the second wheel 5 in a shock absorbed state. That is, the rubber dampers 6 receive a compressive force at radially outer and inner portions of end surfaces 6a. End surfaces 6a receive compressive forces from the first projections 3e and the auxiliary projections 3f through the receiver plates 7. End surfaces 6b receive the compressive forces applied by the second projections 5b near radially central portions of end surfaces 6b through the receiver plates 7 to thereby exhibit a shock absorbing action.

Figure 3B:
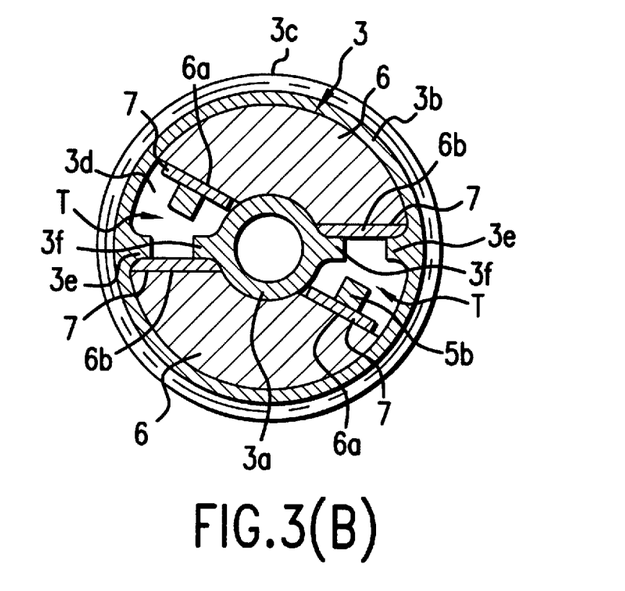

When a rotational load acts on the first wheel 3 in the direction opposite to the arrow X in FIG. 3(A) (in a counterclockwise direction), the relationship opposite to the above is established as shown by FIG. 3 (B), so that the rubber dampers 6 again apply a shock absorbing action.

When the electric motor 2 is driven in the speed reducer arranged as described above, the driving force thereof is transmitted to the power output shaft 4 through the worm gear 2b connected to the output shaft 2a, the first wheel 3, the rubber dampers 6 and the second wheel 5, wherein a shock absorbing action is executed by the rubber dampers 6.

In a first embodiment of the present invention, power is transmitted such that shock is absorbed by the rubber dampers 6. In this case, however, since the projections 3e, 3f, and 5b of the first and second wheels 3 and 5 are disposed together in the intervals T between the adjacent rubber dampers 6, the power is transmitted such that all the rubber dampers 6 are compressed. As a result, a shock absorbing action is executed by all of the rubber dampers 6 being compressed, unlike conventional arrangements wherein a shock absorbing action is executed by only half of the rubber dampers since the projections of respective wheels are alternately disposed in an axis-rotational direction. Therefore, a shock absorbing force is dispersed over a wide range to thereby permit an excellent shock absorbing capability to be exhibited. The respective rubber dampers 6 can therefore be substantially reduced in size so that the size and weight of the speed reducer can be reduced.

In the first embodiment, since the receiver plates 7 are disposed on the end surfaces 6a and 6b of the rubber dampers 6 so as to entirely cover them, even if the projections 3e, 3f and 5b are smaller than the end surfaces 6a and 6b of the rubber dampers 6, the loads from the projections 3e, 3f, and 5b are received by the entire end surfaces. As a result, since the effective shock absorbing capability of the rubber dampers 6 is increased while they are uniformly compressed and deformed without being strained, reliability is enhanced and excellent durability can be obtained.

Furthermore, since the first projections 3e and the auxiliary projections 3f are located to the outside and the inside in the diametrical direction with respect to the receiver plates 7 in the first embodiment, they are abutted against the receiver plates so as to press them on both the sides thereof, so that the rubber dampers 6 are more uniformly pressed. In addition, since the second projections 5b press the rubber dampers 6 at approximately the center thereof in the diametrical direction thereof, the rubber dampers 6 are uniformly pressed because they are not pressed at diametrically spaced positions.

Figure 4:
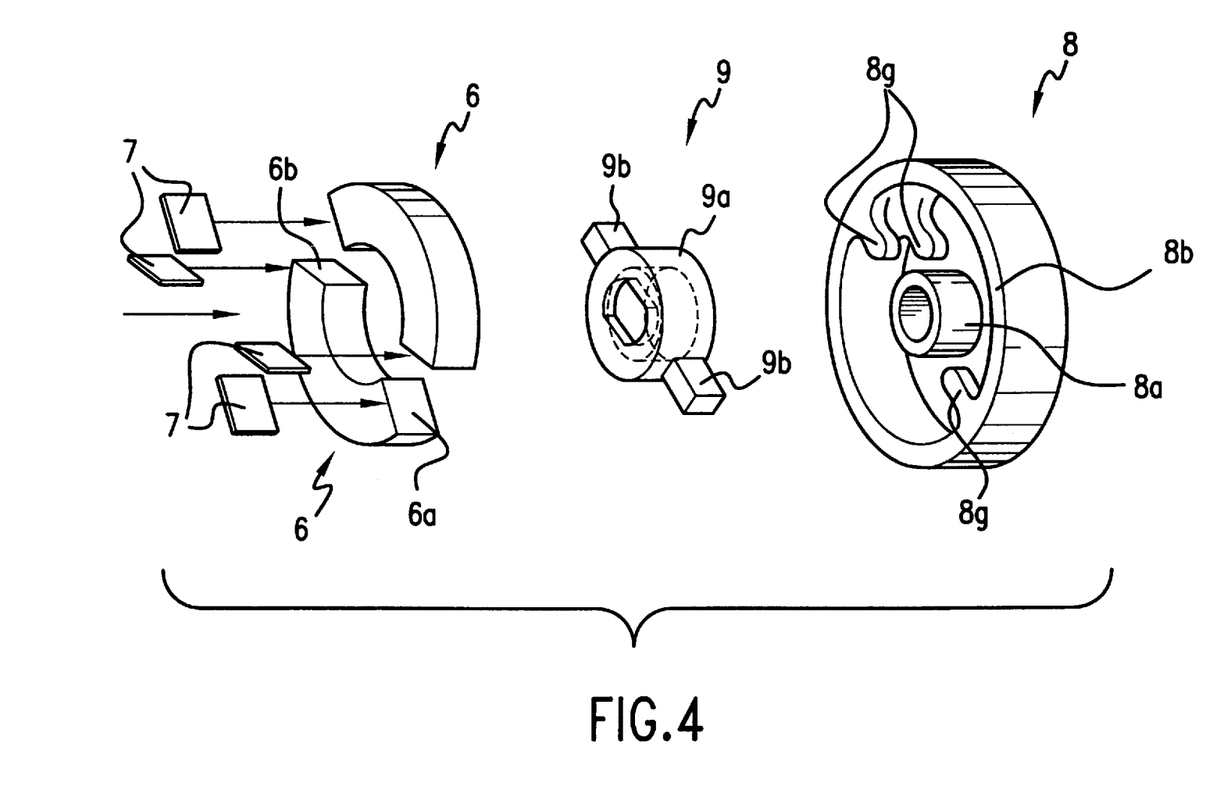
FIG. 4 is an exploded perspective view of the main portion of a second embodiment of the speed reducer.

Next, a second embodiment will be described based on FIG. 4. In the drawing, the same numerals as used in the first embodiment are used to denote parts common (similar) to those of the first embodiment and the detailed description thereof is omitted. In the second embodiment, a pair of first projections 8g project from the inner peripheral surface of an outer cylindrical portion 8b in a radially inward direction with an interval also being defined therebetween in an axial direction. Thus, intervals are formed between the extreme ends of the projecting pieces 8g and a central boss portion 8a. A second wheel 9 is composed of a second wheel boss portion 9a which is loosely engaged in the intervals between the extreme ends of the first projections 8g and the outer peripheral surface of the first wheel boss portion 8a. Second projections 9b project from boss portion 9a of the second wheel in a radially outward direction and are loosely engaged in the intervals in the axial direction of the pair of first projections 8g.

The second embodiment arranged as described above is provided with rubber dampers 6 having end surfaces 6a and 6b that are spaced in the axis-rotational direction and receiver plates 7 are attached to the end surfaces 6a and 6b as with the first embodiment. Depending upon the direction of a rotational load applied to the first wheel 8, the receiver plates 7 of the rubber dampers 6 on the one end surfaces 6a thereof are pressed by the first projections 8g and the receiver plates 7 of the rubber dampers 6 on the other end surfaces 6b are pressed by the second projections 9b, or alternatively the receiver plates 7 on the other end surfaces 6b are pressed by the first projections 8g and the receiver plates 7 on the one end surfaces 6a are pressed by the second projections 9b. In any case, however, since the end surfaces of the rubber dampers 6 are entirely pressed through the receiver plates 7, there can be obtained an effect similar to that of the first embodiment such as the increase of an effective shock absorbing capability and the like.

Figure 5:
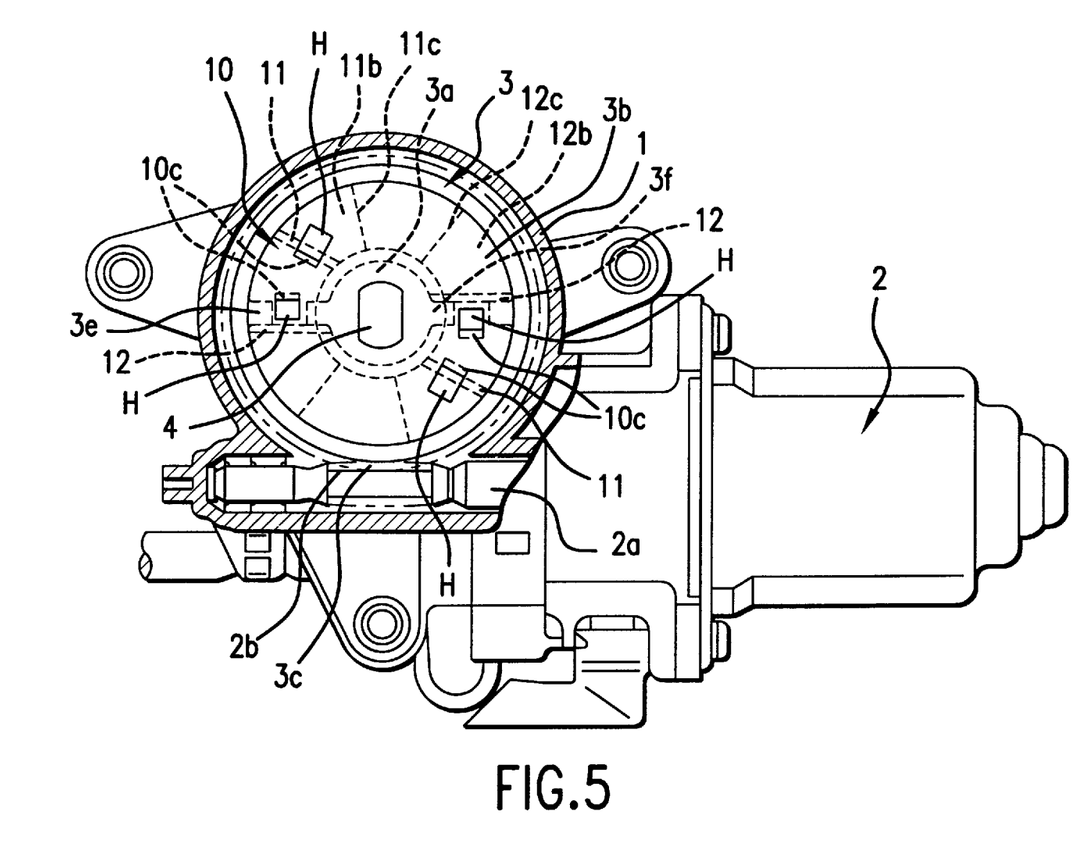
FIG. 5 is a plan view, partly in cross section, of the speed reducer of a third embodiment.
Figure 6:
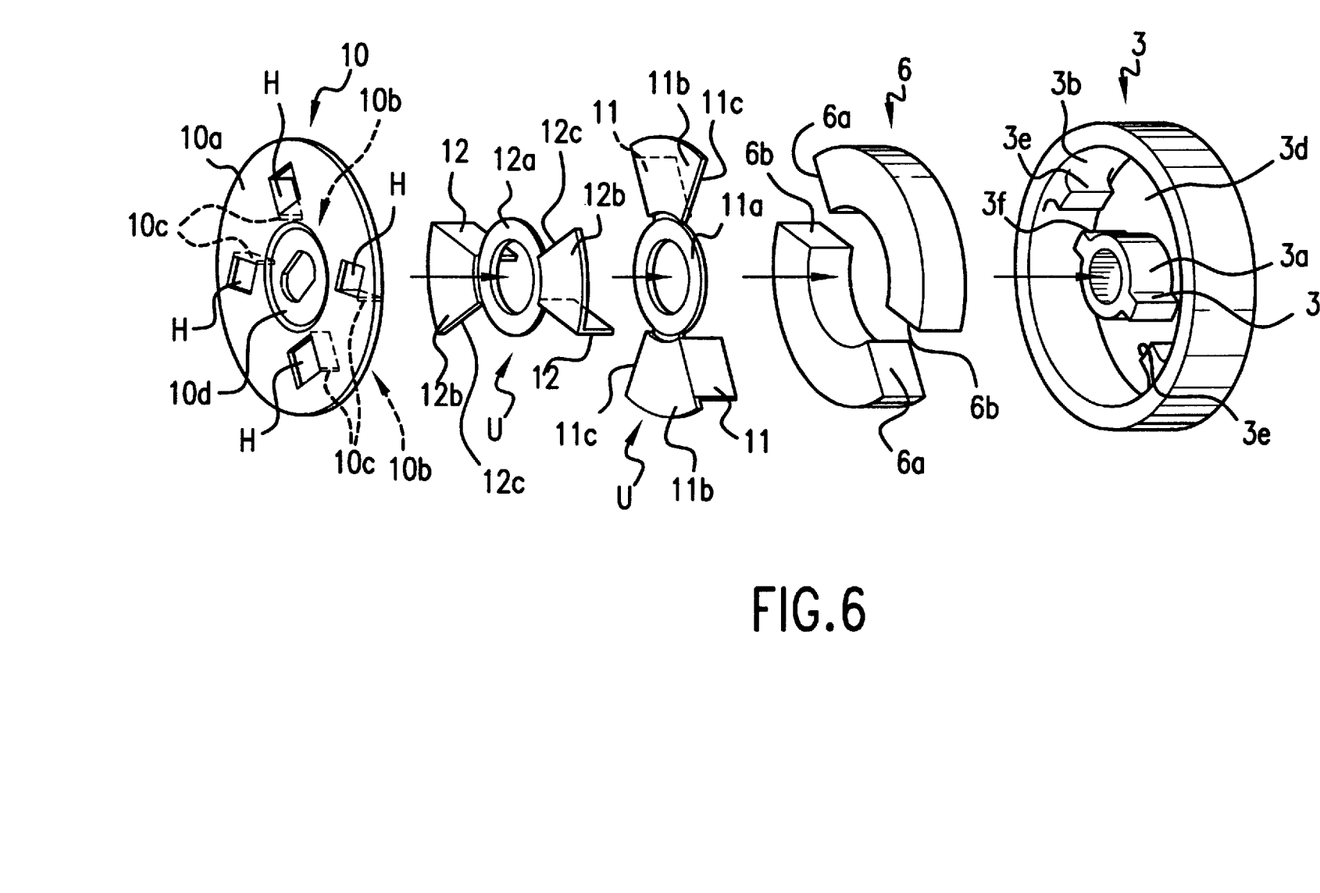
FIG. 6 is an exploded perspective view of the main portion of the third embodiment.
Figure 7:
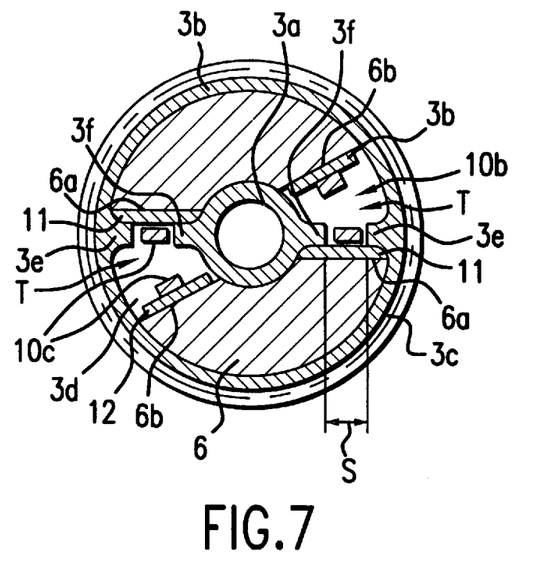
FIG. 7 is a cross sectional plan view of the main portion of the third embodiment.

A third embodiment will be described based on FIG. 5 to FIG. 7. A first wheel 3 of the third embodiment is arranged similarly to that of the first embodiment. That is, a pair of first projections 3e project from the inner peripheral surface of the outer cylindrical portion 3b of a first wheel in a radially inward direction, the first projections 3e being located on an arbitrary diameter and extending in an axial direction. A pair of auxiliary projections 3f project from the outer peripheral surface of the first wheel boss portion 3a in a radially outward direction such that they confront the first projections 3e from the inside thereof with intervals S being formed between the extreme ends of the first projections 3e and the extreme ends of the auxiliary projections 3f.

A second wheel 10 of the third embodiment has two pairs of second projections 10b which are located at a radially central position of a disc-shaped portion 10a. The second projections 10b are positioned for passing through the intervals S between the respective projections 3e and 3f on the first wheel 3 in the axis-rotational direction. The second projections 10b are formed from cut/raised pieces 10c of wheel disc portion 10a such that they are adjacent to each other in the axis-rotational direction. The interval between the cut/raised pieces 10c in the axis-rotational direction is set smaller than the intervals T between the rubber dampers 6 in the axis-rotational direction so that the first projections 3e, the auxiliary projections 3f and the second projections 10b are disposed together in the intervals T between the rubber dampers 6. Then, the first and second wheels 3, 10 can relatively rotate since the second projections 10b pass through the intervals S between the projections 3e and 3f.

Although receiver plates are attached to the respective end surfaces 6a, 6b of the rubber dampers 6 which serve as surfaces confronting the projections 3e, 3f, 10b, pairs of the receiver plates are arranged as a receiver plate unit U by being formed integrally in the third embodiment so as to reduce the number of parts. That is, a receiver plate assembly U is formed as one surface receiver plate U and is used to cover the one end surfaces 6a of the rubber dampers 6 of the third embodiment. Likewise, a receiver plate assembly U is formed as another surface receiver plate U and is used to cover the other end surfaces 6b of the rubber dampers 6.

The receiver plate units U are composed of boss portions 11a, 12a, a pair of support plate portions 11b and a pair of support plate portions 12b extending radially outward from the boss portions 11a, 12a in an approximately fan shape, and the receiver plates 11, 12 formed by bending portions of support plate portions 11b and 12b in the axial direction. The boss portions 11a, 12a are axially offset with respect to the support plate portions 11b, 12b, and with respect to each other so that they can be stacked and externally engaged with a boss portion 10d formed on the second wheel disc portion 10a. Boss portions 11a, 12a are rotatable in the axis-rotational direction with support plate portions 11b, 12b being positioned on a common plane. The receiver plates 11 of one of the receiver plate units U and the receiver plates 12 of the other of the receiver plate units U are arranged in facing relationship and separated in the axis-rotational direction by intervals T so that the receiver plates 11 are fitted to the one end surfaces 6a of the rubber dampers disposed on one side of the support plate portions 11b and the receiver plates 12 are fitted to the other end surfaces 6b of the rubber dampers disposed on the same side of the support plate portions 12b.

Although the receiver plate units U are assembled to the second wheel 10 such that the boss portions 11a, 12a are overlapped, the second projections 10b composed of the pairs of cut/raised pieces 10c are located between the receiver plates 11, 12.

When power is transmitted from the first wheel 3 to the second wheel 10, as the first wheel 3 rotates, the rubber dampers 6 receive a compressive force applied by the first projections 3e and the auxiliary projections 3f at radially outer and inner portions of the one end surfaces 6a thereof in the axis-rotational direction through the receiver plates 11. The rubber dampers 6 receive the compressive force applied by the cut/raised pieces 10c located in one of the axis-rotational directions of the second projections 10b at the center in the diametrical direction on the other end surfaces 6b of rubber dampers 6 in the axis-rotational direction thereof through the receiver plates 12, by which the power is transmitted to the second wheel 10 in a shock absorbed state. At the time, the receiver plate units U attached to the one end surfaces 6a and the other end surfaces 6b of the rubber dampers are rotated in the axis-rotational direction as the rubber dampers 6 are compressed by being pressed by the projections 3e, 3f and 10b. When a rotating load acts on the first wheel 3 in the direction opposite to the above rotation, a shock absorbing action is executed by the rubber dampers 6 in the relationship contrary to the above.

The support plate portions 11b, 12b overlap first axial end surfaces of the rubber dampers 6. The end edge portions 11c, 12c of the support plate portions 11b, 12b, opposite from receiver plates 11, 12 are spaced from each other in the axis-rotational direction along the first axial end surfaces of the rubber dampers 6. End edge portions 11c, 12c are formed so as to lie along the axial end surface of the second wheel 10 on the side of cut/raised pieces 10c. The intervals between the end edge portions 11c, 12c are defined such that the support plates 11b, 12b are not abutted against each other by ordinary power transmission torque, but they are butted against each other when maximum permissible torque is applied thereto. Support plates 11b, 12b thereby ensure that no excessive load is applied to the rubber dampers 6.

Since the receiver plates 11, 12 are attached to the end surfaces 6a, 6b of the rubber dampers 6 also in the third embodiment, even if the projections 3e, 3f and 10b are smaller than the end surfaces 6a, 6b of the rubber dampers, a load can be received by the entire end surfaces. As a result, the effective shock absorbing capability of the rubber dampers 6 can be increased as well as the rubber dampers are uniformly compressed and deformed without being strained. Hence, reliability is enhanced and excellent durability can be obtained as with the first embodiment.

Since the first projecting portions 3e and the auxiliary projecting portions 3f are located to the outside and the inside in the diametrical direction with respect to the receiver plates 11, 12, they are abutted against the receiver plates so as to press them on both the sides thereof, so that the rubber dampers 6 are more uniformly pressed. In addition, since the second projections 5b press the rubber dampers 6 at the center in the diametrical direction, the rubber dampers 6 are uniformly pressed because it is prevented that the positions where they pressed are dislocated in the diametrical direction.

Since the pair of receiver plates 11 and the pair of receiver plates 12 interposed between the end surfaces 6a, 6b of the rubber dampers are arranged as the receiver plate units U, when they are assembled to the speed reducer, an assembling job is simplified as compared with the case that the receiver plates 11, 12 are independently assembled. The number of parts can also be reduced. Further, since the receiver plate units U are coupled with the receiver plates 11, 12 through the boss portions 11a, 12a and the boss portions 11a, 12a are loosely engaged with the second wheel boss portion 10d, the unintentional removal of the receiver plates 11, 12 can be prevented.

Further, in the third embodiment, the support plate portions 11b, 12b of the receiver plate units U close the holes H which are made when the second projecting portions 10b are formed by being cut and raised from disc portion 10a. Therefore, when the first and second wheels 3, 10 are assembled, the rubber dampers 6 are prevented from projecting through the holes H when they are compressed.

A set, three sets or a plurality of sets of the projections may be formed from the first and second wheels instead of the two sets disclosed in the above respective embodiments. In this case, the receiver plates covering the same end surfaces of the rubber dampers in a given axis-rotational direction can be integrally formed as receiver plate units. All the individual end surfaces may be covered with separate receiver plates or each pair of end surfaces may be covered with integrally formed receiver plate units.

What is claimed is:

1. A speed reducer with a shock absorbing mechanism, comprising:

a first wheel for receiving forward and backward driving forces from a motor;

a second wheel for transferring power from said first wheel to a power output;

shock absorbing rubber dampers each having respective end surfaces and being disposed in relationship to each other such that intervals are defined between the end surfaces of said rubber dampers in an axis-rotational direction;

said first wheel having first projections and being positioned such that said first projections extend into said intervals;

said second wheel having second projections and being positioned such that said second projections extend into said intervals; and said first wheel being positioned relative to said second wheel such that rotation of said first wheel in an axis-rotational direction causes said first projections to compress said rubber dampers against said second projections and receiver plates being attached to the respective end surfaces of said rubber dampers between said first and second projections and said end surfaces of said rubber dampers.

2. The speed reducer with a shock absorbing mechanism according to claim 1, wherein a pair of said receiver plates positioned against respective end surfaces of said rubber dampers on the same side of two of said intervals as viewed in a first axis-rotational direction are formed as an integral receiver plate unit.

3. The speed reducer with a shock absorbing mechanism according to claim 2, wherein said first wheel has a wheel boss portion and a wheel outer peripheral portion, said first projections extending radially inwardly from said wheel outer peripheral portion such that second intervals are formed between said first projections and said wheel boss portion, said second wheel having a wheel disk portion and second projections extending axially from said wheel disk portion and passing through said second intervals during relative rotation between said first and second wheels.

4. The speed reducer with a shock absorbing mechanism according to claim 3, wherein auxiliary projections extend radially outwardly from said first wheel boss portion in radial alignment with said first projections such that said second intervals are formed between said first projections and said auxiliary projections.

5. The speed reducer with a shock absorbing mechanism according to claim 3, wherein said, second projections are formed by cutting and bending portions of said second wheel disk portion in an axial direction.

6. The speed reducer with a shock absorbing mechanism according to claim 5, wherein auxiliary projections extend radially outwardly from said first wheel boss portion in radial alignment with said first projections such that said second intervals are formed between said first projections and said auxiliary projections.

7. The speed reducer with a shock absorbing mechanism according to claim 2, wherein said first wheel has a boss portion and an outer peripheral portion and said first projections are formed as a pair of axially spaced projections extending radially inwardly from said first wheel outer peripheral portion and second intervals are defined between said first projections and said first wheel boss portion, said second wheel having a second wheel boss portion and second wheel boss projections extending radially outwardly from said second wheel boss portion so as to pass between said axially spaced first projections and within said second intervals as said first and second wheels are rotated relative to one another.

8. The speed reducer with a shock absorbing mechanism according to claim 2, wherein said integrally formed receiver plate unit includes a central receiver plate boss portion and support plate portions projecting radially outwardly from said receiver plate boss portion with said receiver plates being bent in an axial direction from said support plate portions.

9. The speed reducer with a shock absorbing mechanism according to claim 8, further including a second integrally formed receiver plate unit, said second integrally formed receiver plate unit including a second pair of receiver plates, a second central receiver plate boss portion and second support plate portions projecting radially outwardly from said second central receiver plate boss portion, wherein said support plate portions and said second support plate portions overlap axial end surfaces of said rubber dampers and side edges of said support plate portions and said second support plate portions of said integrally formed receiver plate units come into abutting relationship when rubber dampers positioned between said integrally formed receiver plate units have been compressed by a predetermined maximum desired amount.

10. The speed reducer with a shock absorbing mechanism according to claim 9, wherein said and said second support plate portions support plate portions are positioned adjacent an axial end surface of said second wheel.

11. The speed reducer with a shock absorbing mechanism according to claim 1, wherein said first wheel has a wheel boss portion and a wheel outer peripheral portion, said first projections extending radially inwardly from said wheel outer peripheral portion such that second intervals are formed between said first projections and said wheel boss portion, said second wheel having a wheel disk portion and second projections extending axially from said wheel disk portion and passing through said second intervals during relative rotation between said first and second wheels.

12. The speed reducer with a shock absorbing mechanism according to claim 11, wherein auxiliary projections extend radially outwardly from said first wheel boss portion in radial alignment with said first projections such that said second intervals are formed between said first projections and said auxiliary projections.

13. The speed reducer with a shock absorbing mechanism according to claim 11, wherein said second projections are formed by cutting and bending portions of said second wheel disk portion in an axial direction.

14. The speed reducer with a shock absorbing mechanism according to claim 13, wherein auxiliary projections extend radially outwardly from said first wheel boss portion in radial alignment with said first projections such that said second intervals are formed between said first projections and said auxiliary projections.

15. The speed reducer with a shock absorbing mechanism according to claim 1, wherein said first wheel has a boss portion and an outer peripheral portion and said first projections are formed as a pair of axially spaced projections extending radially inwardly from said first wheel outer peripheral portion and second intervals are defined between said first projections and said first wheel boss portion, said second wheel having a second wheel boss portion and second wheel boss projections extending radially outwardly from said second wheel boss portion so as to pass between said axially spaced first projections and within said second intervals as said first and second wheels are rotated relative to one another.

* * * * *